United States Patent [19]

Perrault et al.

[11] Patent Number: 5,118,066

[45] Date of Patent: Jun. 2, 1992

[54] SUPPORT SYSTEM FOR MARINE USE

[76] Inventors: Frederick Perrault, 1727 Date Ave., Torrance, Calif. 90503; Raymond E. Perrault, 3845 Crest Rd., Rancho Palos Verdes, Calif. 90274

[21] Appl. No.: 712,460

[22] Filed: Jun. 10, 1991

[51] Int. Cl.⁵ .............................................. A47H 1/10
[52] U.S. Cl. ................................................... 248/333
[58] Field of Search ............... 248/327, 333, 343, 317, 248/125; 362/404, 147

[56] References Cited

U.S. PATENT DOCUMENTS

| | | | |
|---|---|---|---|
| 2,217,533 | 10/1940 | Wolarsky | 248/333 |
| 2,628,755 | 2/1953 | Marchionda | 248/333 X |
| 2,670,917 | 3/1954 | Hoffman | 248/317 X |
| 3,273,837 | 9/1966 | Willert et al. | 248/317 |
| 3,493,206 | 2/1970 | Albro | 248/327 X |
| 3,494,586 | 2/1970 | Haynes | 248/327 X |
| 3,495,796 | 2/1970 | Fruh | 248/327 |

Primary Examiner—Ramon O. Ramirez
Attorney, Agent, or Firm—Richard F. Carr; Richard L. Gausewitz; Allan Rothenberg

[57] ABSTRACT

A suspension system is provided for use with a four-sided stud welded to a supporting surface. The suspension system includes a square tube having a series of openings through its side walls. One end of the tube receives the stud and is bolted to it. The opposite end of the square tube is received between opposed channels of a bracket which has a bottom plate portion adapted to support an object. Bolts extend through openings in the channels and the bottom end of the square tube to complete the attachment.

8 Claims, 1 Drawing Sheet

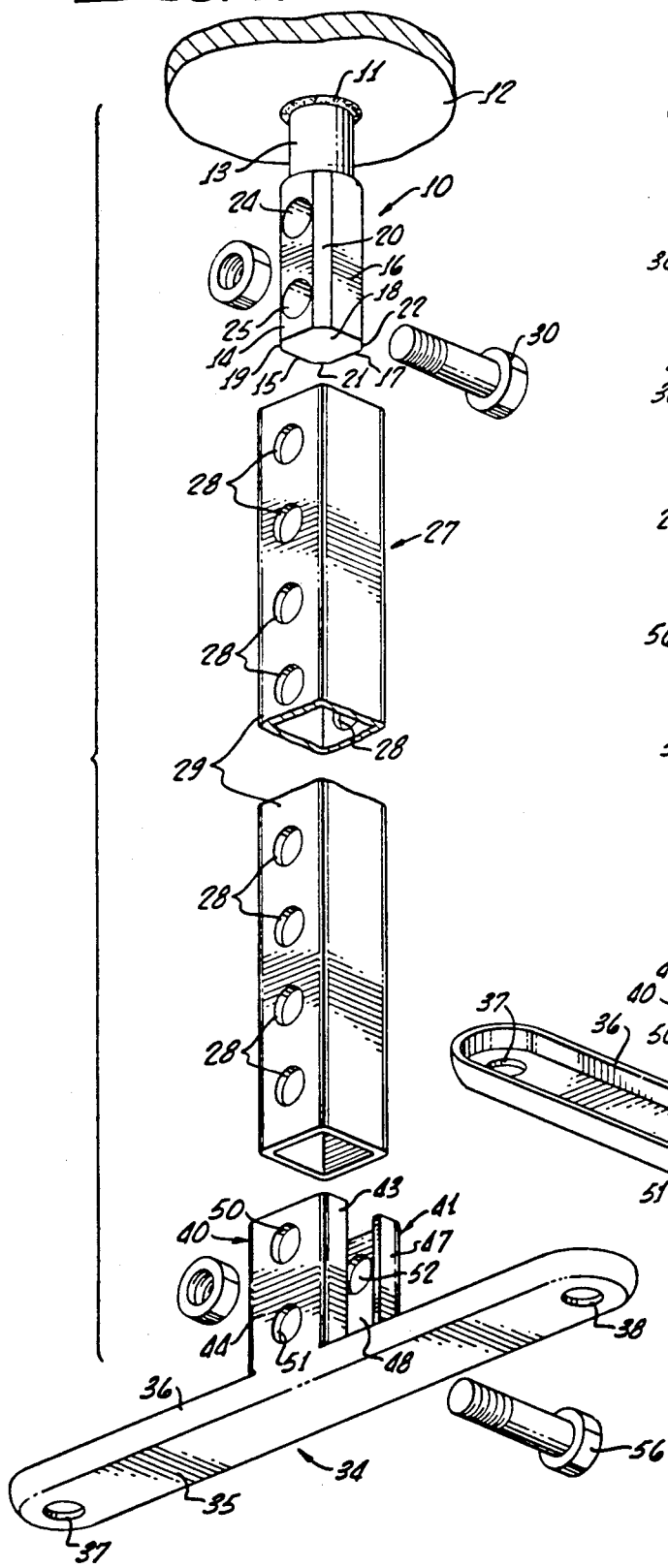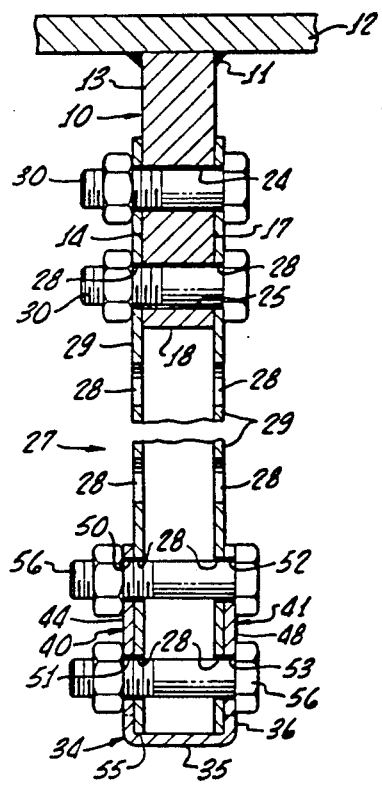

SUPPORT SYSTEM FOR MARINE USE

BACKGROUND OF THE INVENTION

In the construction of ships, it is customary to suspend light fixtures and other items of equipment from the deck above, or other supporting surface, so that the fixture or other item is positioned in the area desired. In the past, the arrangements for supporting light fixtures or other items of equipment have been expensive, difficult to install, and unduly complex and heavy. Installation has been time consuming and costly. Adjustment of the support has not been possible.

The long-accepted way of securing light fixtures has involved a very time consuming procedure in which pipe supports are welded to a deck. This takes around one-half hour per light fixture to complete. It has been proposed to provide a threaded connection to allow a more rapid attachment. However, this has required rotation of the entire light fixture which is impossible for a light fixture of any appreciable length within the confines of narrow spaces found in both naval and commercial ships.

SUMMARY OF THE INVENTION

The present invention provides an improved support, primarily for use aboard ships, which is of simplified construction, is lightweight, economical to make, and easy to install. The attachment is strong and rigid and the position of the support may be varied.

The supporting device is adapted for use with a stud that is welded to a ship deck or other supporting surface. This type of stud ordinarily is used as the support for a vertical angle serving as the downcomer of a wireway system, and has had nothing to do with the suspension of fixtures and equipment. The stud has a cylindrical portion which is welded to the deck, beneath which is a four-sided section in which flat sides are connected by finite rounded corners. Two openings extend through the lower part of the stud. In its conventional use, the two flanges of the downcomer angle engage two of the flat sides of the stud, and bolts extend through one of the flanges and the stud to make an attachment.

The supporting device of this invention includes a square tube of the type which is provided with a series of equally spaced openings through each of its walls. One end of the tube is fitted over the lower portion of the stud and bolts are passed through opposite openings in the square tube and the openings in the stud for attaching the tube to the stud.

The bottom end of the square tube is attached to a special bracket which is an integral member that may be made of aluminum and includes a bottom plate portion that is adapted to engage the device to be supported. Generally, openings are provided through the plate portion through which fasteners can be extended. A flange extends around the periphery of the plate portion for enhanced strength and rigidity. Projecting upwardly from the flange of the bracket are two opposed shallow channels. Each of these includes two side flanges which are parallel and perpendicular to a central web. Each central web is provided with two openings through it, one above the other.

In use, the bottom end of the square tube is inserted into the space between the two opposed channels so that the side flanges of the channels overlap two side walls of the tube and the central webs of the channels overlie the other two opposite walls of the tube. The bottom end of the square tube is positioned in adjacency with the plate portion of the bracket. Openings in the square tube are aligned with two openings in the web of each of the channels and bolts are extended through the aligned openings for securing the square tube to the bracket.

The connection is strong and rigid not only because it is secured by bolts but also because of the engagement of the channels with the walls of the square tube. Also, with the end edge of the square tube engaging the plate portion of the bracket, the tendency for relative motion of the bracket and square tube is minimized. Installation is very easily accomplished and the components are readily manufactured and of relatively low cost. Great flexibility is provided in the location where the article is suspended because the square tube can be cut to any desired length to position the bracket at an appropriate height for suspending the article.

BRIEF DESCRIPTION OF THE DRAWINGS

FIG. 1 is an exploded perspective view of the support system of this invention;

FIG. 2 is a perspective view of the lower bracket separated from the other components of the system; and FIG. 3 is a longitudinal sectional view of the assembled support system.

DETAILED DESCRIPTION OF THE INVENTION

As shown in FIGS. 1 and 3, a stud 10 of conventional design is secured by a weld 11 to a deck 12 so as to form a vertical depending post. The upper portion 13 of the stud 10 is cylindrical and is the part which is welded to the deck 12. Below the cylindrical portion 13 the stud 10 includes four flats 14, 15, 16 and 17 that extend to the bottom end 18 of the stud. The flats are arranged in a square pattern so that the flats 14 and 17 are parallel and are at right angles to the other parallel flats 15 and 16. Convexly rounded corners 19, 20, 21 and 22 interconnect the adjacent flats 14, 15, 16 and 17. Extending transversely through the stud 10 are two spaced cylindrical openings 24 and 25 which extend between the flat 14 and the flat 17. The axes of the openings 24 are parallel to each other and also to the flats 15 and 16.

A square tube 27, preferably of aluminum, is provided with a series of spaced openings 28 through each of its four walls 29. The spacing between adjacent openings 28 is the same as the spacing between the openings 24 and 25 of the stud 10. The square tube 27 is extended over the lower portion of the stud 10, as seen in FIG. 3, and connected to the stud by two bolts 30 which extend through opposite openings 28 in the tube 27 and the openings 24 and 25 in the stud. If the tube 27 is slightly oversize, it is preferred to tighten the bolts 30 sufficiently to deflect the walls 29 so that these walls overlie and engage the flats 14 and 17 of the stud 10. In that way, a secure attachment is made and there is minimal tendency for the tube 27 to wobble relative to the stud 10.

An adapter bracket 34 connects to the bottom end of the tube 27 and provides the means to suspend a light fixture or other item of equipment. This member may be made of aluminum to be light in weight. The bracket 34 is an integral member that includes a flat plate 35 at its lower end, normally positioned in a horizontal plane. The plate 35 is elongated and has rounded ends. A flange 36 extends around its periphery to provide strength and rigidity. Openings 37 and 38 are provided adjacent the opposite ends of the plate 35 and are used for making the attachment to the item of equipment that is to be suspended.

Two channels 40 and 41 are perpendicular to the plate 35 and project upwardly from the edge of the flange 36. These channels are positioned at the central portion of the plate 35 and face toward each other. The channel 40 includes two opposite parallel side flanges 42 and 43 which extend at right angles from the outer edges of a central web 44. The latter element forms a continuation of the flange 36 and is in the same plane as the flange. Similarly, the channel 41 includes side flanges 46 and 47 perpendicular to a central web 48 and extending from its edges. The flange 42 of the channel 40 is opposite and spaced from the flange 46 of the channel 41. Of course, the other two flanges 43 and 47 also are spaced apart and opposed to each other. The spacing between the two side flanges 42 and 43 of the channel 40 and the spacing between the two side flanges 46 and 47 of the channel 41 is substantially the distance between opposite side walls 29 of the tube 27. The distance between the central web 44 of the channel 40 and the central web 48 of the channel 41 also equals approximately the spacing between the opposite side walls 29 of the tube 27.

Two spaced openings 50 and 51, one above the other, extend through the central web 44 of the channel 40 and are opposite from similar openings 52 and 53 through the central web 48 of the channel 41.

In attaching the adapter bracket 34 to the lower end of the square tube 27, the tube is received by the channels 40 and 41. Two sets of opposed openings 28 of the tube 27 are aligned with the openings 50 and 52, and 51 and 53 in the channels. Preferably, when this takes place, the bottom end edge 55 of the tube 27 bears against the plate 35 of the bracket 34. Two bolts 56 connect the bracket 34 to the tube 27. One bolt 56 passes through the opposite openings 50 and 52 of the channels and through two of the openings 28 in the tube 27. The other bolt 56 is received in the openings 50 and 53 as well as an adjacent pair of opposite openings 28 in the tube 27. Because of the complementary reception of the tube within the recess defined by the channels 40 and 41, the engagement of the bottom end 55 of the tube 27 with the plate 35 and the attachment by the bolts 56, a rigid connection between the tube 27 and the bracket 34 is obtained. The tube 27 is stabilized by the channels 40 and 41.

The bracket 34 may be suspended at any desired height simply by cutting the tube 27 to an appropriate length. If the bracket 27 is to suspend an item relatively high, the tube is cut short, and, of course, a longer tube will position the bracket lower for lowering the location of the suspended item.

The bottom plate 35 of the adapter bracket may take a variety of forms, depending upon the nature of the item to be suspended. Irrespective of this, the channels 40 and 41 should be integral with the plate 35 and located centrally so that the item suspended will not impose an eccentric load, but instead will result in a load along the longitudinal axis of the tube 27.

The foregoing detailed description is to be clearly understood as given by way of illustration and example only, the spirit and scope of this invention being limited solely by the appended claims.

What is claimed is:

1. In combination with a stud attached to a supporting surface, said stud having a lower portion provided with four flat sides and having at least one opening extending transversely therethrough interconnecting two of said flat sides, a supporting device comprising
    a square tube having a series of spaced aligned openings through opposite walls thereof,
        one end of said tube receiving said lower portion of said stud with said flat sides of said stud being opposite the walls of said tube,
    fastener means extending through opposite aligned openings in said tube and said opening in said stud for attaching said tube to said stud, a bracket including a flat plate adapted for connection to an object to be supported, and a pair of channels perpendicular to said plate,
        each of said channels including opposite parallel side flanges perpendicular to a central web,
        said channels being opposite to each other and spaced apart such that the spacing between said central webs equals substantially to the spacing between opposite walls of said square tube,
        the spacing between said side flanges of each of said channels being substantially equal to the spacing between opposite walls of said tube,
        said central webs including opposed aligned openings therethrough, the opposite end of said tube being complementarily received between said channels with openings in said tube aligned with said openings in said central web, and
    fastener means extending through said openings in said central webs and said last-mentioned openings in said tube for attaching said bracket to said tube.

2. A device as recited in claim 1 in which said opposite end of said tube engages said flat plate.

3. A device as recited in claim 1 in which there are two of said openings in each of said central webs, and said fastener means includes two bolts extending through said openings in said central webs and openings in said tube.

4. A device as recited in claim 1 including a flange along the periphery of said flat plate, said central webs of said channels forming continuations of said flange.

5. A device as recited in claim 1 in which said channels and said flat plate are integral.

6. A device as recited in claim 1 in which said tube is severable whereby the position of an item connected to said flat plate relative to said supporting surface can be adjusted by adjusting the length of said tube.

7. In combination with a stud attached to a supporting surface, said stud having a lower portion provided with four flat sides and having at least one opening extending transversely therethrough interconnecting two of said flat sides, and
    a square tube having a series of spaced aligned openings through opposite walls thereof,
        one end of said tube receiving said lower portion of said stud and being connected thereto,
    a bracket comprising a bottom transverse element adapted for connection to an object to be supported, and a pair of opposed spaced channels projecting upwardly from said element,
    each of said channels including two parallel side flanges perpendicular to and projecting from the opposite side edges of a central web, said channels defining a recess substantially complementary to said square tube, the opposite end of said square tube being received in said recess and stabilized by said side flanges and said central webs, each of said central webs including two openings therethrough spaced longitudinally thereof, said openings in said central webs of said pair of channels being in aligned pairs which are aligned also with openings in said opposite walls of said square tube, and fastener means extending through said openings in said central webs and said openings in said tube for attaching said bracket to said tube.

8. A device as recited in claim 7 in which said channels and said transverse element are integral.

* * * * *